Figure 1:
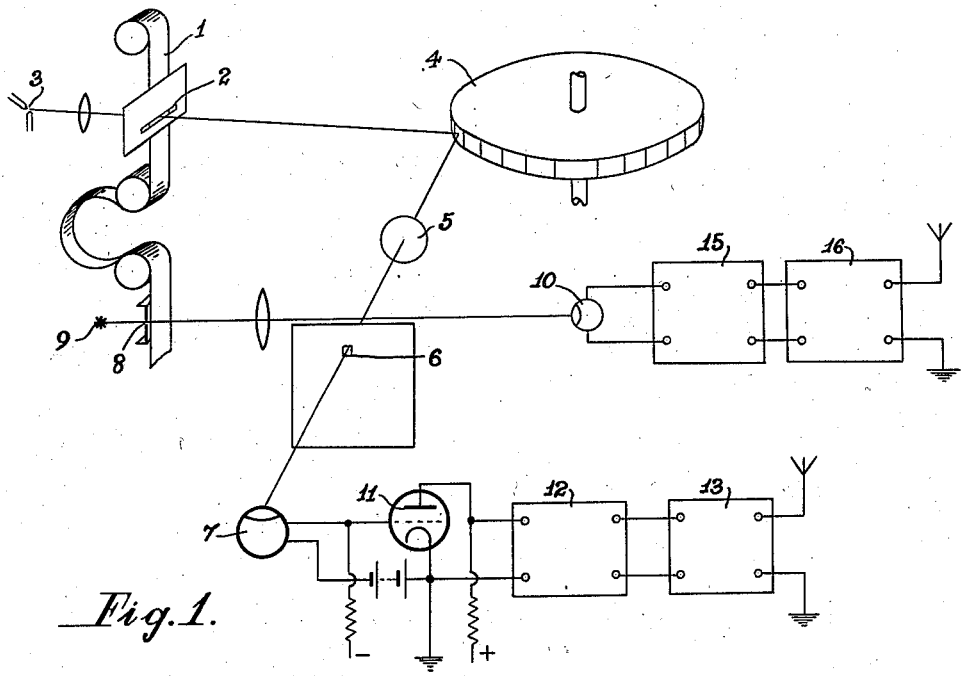

July 19, 1938.   C. O. BROWNE ET AL   2,124,394

PICTURE AND SOUND TRANSMISSION

Filed Aug. 10, 1934

C. O. BROWNE
JOHN HARDWICK
INVENTORS
BY
ATTORNEY.

Patented July 19, 1938

2,124,394

UNITED STATES PATENT OFFICE 2,124,394

PICTURE AND SOUND TRANSMISSION

Cecil Oswald Browne, West Acton, London, and John Hardwick, West Drayton, England, assignors to Electric and Musical Industries Limited, Middlesex, England, a company of Great Britain Application August 10, 1934, Serial No. 739,230
In Great Britain August 14, 1933

4 Claims. (Cl. 178—5.8)

The present invention relates to television and the transmission of pictures with sounds appropriate thereto.

It is the aim, in most known television systems, to produce at the receiver an image of which the brightnesses of all points are exactly proportional to the intensities of the light emanating from corresponding points of the object at the transmitter.

It has long been recognized in the cinema art, however, that if the brightnesses of all points of an image viewed on a projection screen are proportional to the brightnesses on the object from which the images are derived, the screen image appears flat and uninteresting to the eye. This effect is believed to be due to the fact that the images are projected in black and white and the additional effect of detail which would be given to the lighter parts of the picture by the natural colours is absent. It is therefore common practice in the cinema industry to develop picture films in such manner that detail in the lighter or less opaque portions of the positive film pictures is brought out, or amplified as it were, relatively to the detail in the darker or more opaque portions of the pictures. A film developed in this way is said to be developed to a "gamma" or "intensity contrast" of value greater than unity and, when projected upon a screen, the images derived from such a film are more pleasing and appear more full of detail than images projected from a film of intensity contrast equal to unity, that is to say, a film in which the light transmitted through all points is exactly proportional to the brightnesses of the corresponding object points.

It is found in fact that a film developed to an intensity contrast of from about 1.8 to 2.0 is most satisfactory in this respect.

The manner in which the development of a film affects the finally reproduced images may be appreciated more clearly from the following considerations:—

The optical density (D) of any point on a negative after development is proportional to the logarithm to the base 10 of the intensity of the light (E) to which that point was exposed. Thus we have the mathematical expression $$D = \gamma \log_{10} E,$$

where $\gamma$ represents a constant. The optical density of any point on a developed negative may also be measured by the ratio of the incident light to the transmitted light (I) which the point will allow to pass through, thus, putting the incident light equal to unity, we have $$D = \log_{10} \frac{1}{I}$$

From these two equations it may be easily shown that the intensity of the transmitted light is equal to the intensity of the exposure raised to the power $-\gamma$ and after reversal by printing we have, for the print, $$I = (E)^{+\beta}.$$

Now if I be plotted as ordinate against E as abscissa and $\gamma$ be given the value unity, a straight line is obtained indicating that for all points of the pictures on the positive print the intensity of the transmitted light is proportional to the intensity of the exposing light, that is to say, is proportional to the brightness of corresponding points on the object.

But if $\gamma$ is given the value 2, a parabolic curve symmetrical about the I axis is obtained. This curve indicates that for small values of I or E a small change in E produces a small change in I but for large values of I and E a small change in E produces a comparatively large change in I. A positive film developed so that $\gamma = 2$ thus shows little detail in dark portions of the pictures and much detail in the brighter portions.

On the other hand if $\gamma$ be given the value ½ a parabolic curve symmetrical about the E-axis is obtained and a positive film developed to this value of $\gamma$ shows greater detail in dark portions of the picture than in lighter portions.

Thus by suitably choosing the way in which a film is developed considerable control is obtained over the relative detail in the dark and light portions of the pictures on the film.

Now it has been found that if, in a television system, an object is scanned and the picture signals amplified in a thermionic amplifier, a parasitic background may be produced in the amplifier by the well-known "Johnson noise", which is caused mainly by the coupling resistances in the early stages of the amplifier, and also by slight variations in the anode current in the early stages of the amplifier due to the "shot" effect. This may cause a parasitic background to appear in the reconstituted pictures at the receiver. A further and even more objectionable form of parasitic background at the receiver is that due to stray radio interference which arrives at the detector of the receiver with the television signals. Parasitic background due to any of the causes mentioned is only objectionable when its intensity is comparable with that of the picture signals. In known systems this occurs when the picture signal corresponds to dark portions of the picture and is of small amplitude.

It is an object of the present invention to provide a method and means for reducing the above described parasitic background effect in television systems.

According to the present invention a method of transmitting an image of an object to a distance comprises the steps of generating electrical picture signals representative of the light and shade of the object to be transmitted, reducing the effective intensity contrast of said picture signals before transmission and increasing the effective intensity contrast of said signals at the receiver.

The present invention further provides a method of transmitting images of objects to a distance comprising the steps of generating electrical picture signals representative of the light and shade of the object to be transmitted and reducing the effective intensity contrast of said picture signals before transmission to a value less than unity.

Further according to the present invention there is provided a method of film television wherein at the transmitter picture signals are derived from a film having an intensity contrast substantially less than 1·8. The most satisfactory value of intensity contrast for viewing can then be obtained by increasing the effective intensity contrast at the receiver. When sounds are transmitted as an accompaniment to the pictures, the effective intensity contrast of the sound signals is preferably maintained at substantially unity throughout the system.

Other features of the invention will be apparent from the following description and the appended claims.

Figure 2:
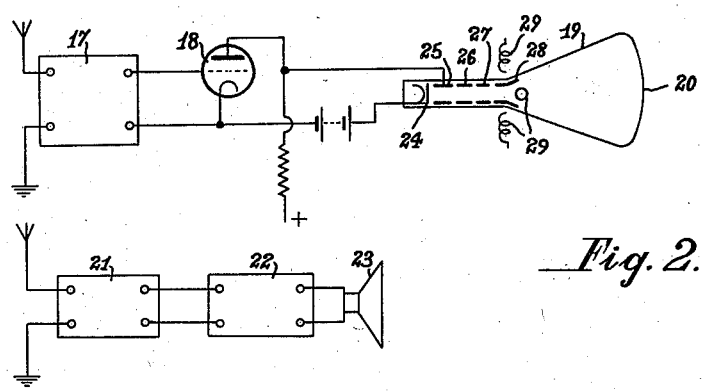
Figure 3:
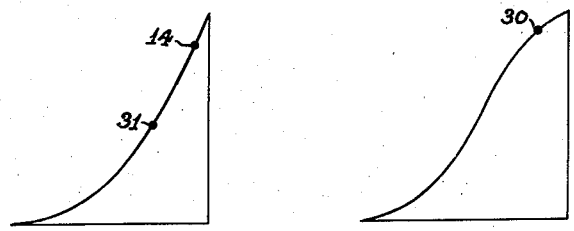
Figure 4:
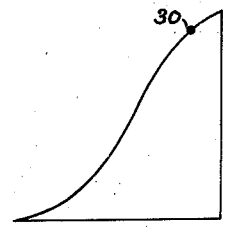

The invention will be described by way of example with reference to the accompanying drawing in which Figs. 1 and 2 are schematic diagrams illustrating a transmitter and a receiver respectively according to the invention and Figs. 3 and 4 are explanatory curves.

Referring to Fig. 1, there is shown diagrammatically an embodiment of the invention as applied to the transmission of a talking motion picture film.

The pictures and sounds may be recorded upon the film 1 from which transmission is to be effected in any known or suitable manner. It will be assumed that the sounds are recorded by the varying density, constant width method.

At any convenient time after the recording processes have been completed the sound and picture records are developed to a gamma or intensity contrast of unity (in contradistinction to the known methods where the film is developed to an intensity contrast of approximately 1·8) and a positive print prepared. The light transmitted by the positive, after development, is thus proportional at all points to the intensity of the exposing light, that is to say, to the intensity of the light emanating from the object.

With the foregoing explanation in mind, it will be readily appreciated that, in comparison with the films used hitherto for purposes of cinematography and television transmission, the detail in the dark portions of the present positive film is emphasized relatively to the detail in the lighter portions of the film.

The picture record 1 is then scanned by moving the film uniformly downwards past a picture scanning gate 2, in front of a light source 3. An image of the gate or slit 2 is reflected by a mirror of the mirror drum 4 and focused by a lens system represented by 5 upon an aperture 6 behind which is a photo-cell 7. The film 1 is also moved at uniform speed past a sound gate 8 whilst a beam of light from a source 9 of constant intensity is passed through the sound track on the film into a second photo-cell 10. The photo-cells 7 and 10 are of normal type and have a substantially linear response, that is to say their effective intensity contrast is substantially unity.

The picture signals from the cell 7 are amplified in a thermionic valve 11 and further in an amplifier represented by the rectangle 12 and are then fed to a transmitter 13. The valve 11 may be operated on the straight part of its anode current ($I_A$)-grid voltage ($E_G$) characteristic, that is to say it may be biased to a point such as 14 in Fig. 3 which shows one such characteristic. It should be noted that the picture signals will cause excursions from the point 14 only in a downward direction since picture signal components down to and including those of effectively zero frequency, are fed to the valve 11 and since the point 14 represents picture black. Because the electrical variations used to modulate the transmitter 13 are proportional to the light and shade of the pictures upon the film 1, a given change of picture light intensity, whether in the darker or lighter parts of the picture, will be represented by the same change of picture signal voltage. Thus the effective intensity contrast of the picture signals transmitted may be said to be the same as that of the film, namely unity.

The sound signals from the cell 10 are amplified substantially without distortion in an amplifier 15 and are fed to a transmitter 16 which may operate upon a different wave length from the picture transmitter 13.

At the receiver such as shown in Fig. 2, the picture signal carrier is received, detected and amplified in a receiver-amplifier 17 and the picture signals are fed to a valve 18 which may also be operated upon a straight part of its characteristic such as point 14 in Fig. 3. The output of the valve 18 is connected to a picture reconstituting device such as a cathode ray tube 19, the picture being reconstituted upon the fluorescent screen 20 of the tube. The sound carrier is received in a receiver 21, the sound signals are amplified substantially without distortion in an amplifier 22 and fed to a reproducer 23.

It has already been pointed out that the parasitic background is noticeable only if the amplitude of the picture signals remains at a value comparable with that of the background; in known systems this occurs because the film is developed to an intensity contrast of 1·8 thus reducing the amplitude of signals corresponding to darker portions of the picture; in the present case, however, the amplitude of signals corresponding to any given intensity change in the darker portions is maintained at the same value as that of the lighter portions owing to the development being taken to a gamma of unity. The parasitic background may thus be made unnoticeable in both light and dark parts of the picture.

The point may perhaps be made still clearer by the following example. There will be considered three points on an object having intensities $I_1$, $I_2$ and $I_3$ respectively and the values of these three intensities will be assumed to be 100, 10 and 1 respectively. If the film is such that $\gamma=1$ and assuming a linear photo-cell is used, the corresponding picture currents will be proportional to 100, 10 and 1 respectively. But if $\gamma=2$, say, the currents will be proportional to 10000, 100, 1, that is to 100, 1 and 0·01 respectively when the highest intensity signal is represented by 100 as before, and it will be clear that any parasitic disturbance will have a far more serious effect when the low intensity signal is represented by an amplitude 0·01 than when it is represented by an amplitude equal to unity as will be the case when the signals are transmitted with $\gamma=1$.

It should be noted, however, that when the picture signals are transmitted with an effective intensity contrast of unity the wave form of the amplified picture signals at the receiver is a substantially faithful representation of a picture having an intensity contrast of unity. If, therefore, these signals are reconverted, without distortion, into pictures, the latter will be of the flat, uninteresting type mentioned above. The device 19 is therefore arranged to increase the effective intensity contrast of the received signals.

The cathode ray tube shown diagrammatically at 19 may comprise an indirectly heated cathode 24, a modulating or "grid" electrode 25 placed close to the cathode, one or more focusing electrodes 26, 27, an anode 28 in addition to the fluorescent screen 20. Means represented at 29 are also provided for deflecting the ray over the fluorescent screen in synchronism with the scanning operation at the transmitter, suitable synchronizing signals being generated and sent from the transmitter so as to hold the scanning processes in synchronism in known manner.

The picture signals are applied as already described between the grid 25 and cathode 24 so as to modulate the intensity of the ray, and thus the intensity of fluorescence, in accordance with the wave form of the picture signals.

Now it is found that if the screen current ($I_s$) of the tube be plotted against the grid volts ($V_g$) a curve is obtained which can be represented by the equation $I_s=V_g^A$ where A represents a constant. The tube may thus be said to have an equivalent intensity contrast represented by A in the above equation. For small values of $I_s$ or $V_g$ a small change in $V_g$ produces a small change in $I_s$ but for large values of $I_s$ or $V_g$ a small change in $V_g$ produces a relatively large change in $I_s$. Thus in normal tubes A is always greater than unity and usually has a value of about 2. By suitable design and with suitable working voltages on its electrodes the tube can be given a characteristic in which A has the value required to raise the effective intensity contrast from unity to the desired higher value.

Thus, in so far as the pictures are concerned, the system as a whole can be made effective in rendering the parasitic background effects relatively imperceptible and in producing pictures of intensity contrast in the neighbourhood of 1·8.

The received sound signals are reconverted into sounds in any known or suitable manner and substantially without distortion so that the overall intensity contrast of the system, in so far as the sounds are concerned, is 1·0 and the sounds remain substantially undistorted throughout the transmission.

If it is required to use a cathode ray tube 19 or other reconstituting device having too low an effective intensity contrast for satisfactory picture production with signals having an effective intensity contrast of unity, the valve 18 can be arranged to increase the effective intensity contrast of the signals before they are fed to the device 19. This can be done by biasing the valve 18 to a point such as 30 in Fig. 4, (it being assumed that picture signal components down to and including the direct component are arranged to be present). Since voltage excursions of the grid of the valve 18 must be arranged to be downward along the characteristic it will be clear that signals of small amplitude are amplified less than signals of greater amplitude and the effective intensity contrast of the valve 18 worked in this way will therefore be greater than unity. The valve utilized to increase the effective intensity contrast is preferably that immediately preceding the reconstituting device in order that the maximum benefits of a low intensity contrast in reducing parasitic background may be obtained.

Similarly if the device 19 has an unduly high effective intensity contrast, the latter may be reduced by operating the valve 18 at a point such as point 31 in Fig. 3.

If instead of a cathode ray tube at the receiver there is used a device such as a neon tube having an effective intensity contrast approximately equal to unity, the effective intensity contrast of the signals may be increased to the desired value as above described before the signals are applied to the device.

It has been found that other devices, such as Kerr and Faraday cells, operate in a manner similar to a cathode ray tube in that during the conversion of electric picture signals into light values, they tend to amplify signals corresponding to light portions relatively to signals corresponding to darker portions. Such devices may thus be said to have an "equivalent intensity contrast" greater than unity and may be used in the above described system in place of the cathode ray tube.

Clearly by a suitable choice of the shape of the lower or upper curved portions of the characteristic curve of the valve by which a change in effective intensity contrast is effected and by suitable design and adjustment of the valve, the amplifier may be arranged in any particular case to give the desired overall effective intensity contrast.

If desired the picture signals may be transmitted with an effective intensity contrast less than unity. For this purpose if the object to be transmitted is a film, the film may be developed to an intensity contract less than unity or a film of intensity contrast greater than unity may be employed and the effective intensity contrast reduced at the transmitter, for example with the aid of the valve 11 in Fig. 1. Thus the valve 11 may be biased to a point such as 31 in Fig. 3, the excursions of grid voltage being as before downwards. By the use of a suitable correcting device, a film of normal intensity contrast, such as about 1·8, may be used for transmission and the effective intensity contrast may be reduced in the correcting device, such as the valve 11, as already described.

If the object of which the image is to be transmitted be three-dimensional (having an intensity contrast of unity) the effective intensity contrast of the picture signals may also be reduced to a value below unity before transmission, as already described in connection with the transmission of film pictures.

In a further method according to the present invention, of transmitting an image of a three-dimensional object, the object is photographed, a negative is prepared, a positive is printed and used for transmission. The negative may be developed to a high intensity contrast (that is one in which detail in the darker portions, corresponding to the lighter portions in the positive, is accentuated), and the positive may be developed to a low intensity contrast, for example equal to unity or less. Alternatively the negative may be developed to a low intensity contrast and the positive may be prepared without change in intensity contrast.

It has been assumed in the above description that the direct and low frequency signal components are arranged to be present wherever a change in intensity contrast of picture signals is effected. This is necessary for satisfactory results if any appreciable changes in average brightness of the object can take place because in the absence of these low frequency components such changes involve a change in the value, in terms of picture brightness, of the zero line about which the picture signals vary, the zero line being a line so placed that the areas enclosed by the picture signals above and below it are equal. Changes in the zero line of the signals are equivalent to changes in the point at which the correcting valve is biased and thus the correction applied will vary with the average brightness of the object.

The presence of the direct and low frequency components at the points where correction of effective intensity contrast takes place can be ensured either by proving couplings capable of transmitting these components (at least up to the modulating point at the transmitter and after the detector at the receiver) or by re-inserting the direct and low frequency signal components at the appropriate point or points, preferably in the manner set forth in co-pending application Serial No. 720,205.

We claim:

1. Combined television and sound transmitting apparatus comprising means for deriving picture signals from an object, means for reducing the effective intensity contrast of said signals and feeding them to an output circuit, means for generating signals corresponding to sounds, a coupling between said sound generating means and a second output circuit whereby said sound signals are fed to said second output circuit substantially without change in effective intensity contrast and means for transmitting the signals from said output circuits.

2. In the television transmission and reception of motion picture records accompanied by sound representation placed upon the film, are apparatus for increasing the ratio of signal level to noise level which comprises means for modifying the intensity contrast of both the sound and picture portions of the film means for developing electrical impulses representative of the optical values of both the sound and the picture representations, means for simultaneously transmitting the representation developed impulses, means for receiving the impulses transmitted, means for distorting during reception only the signals representative of the optical picture, and separate means for reproducing both the optical and the sound signal impulses simultaneously.

3. Combined television and sound transmitting apparatus comprising means for deriving picture signals from an object, means for reducing the effective intensity contrast of said signals comprising an amplifier having a curved response characteristic and feeding them to an output circuit, means for generating signals corresponding to sounds, a coupling between said sound generating means and a second output circuit whereby said sound signals are fed to said second output circuit substantially without change in effective intensity contrast, and means for transmitting the signals from said output circuits.

4. Combined television and sound transmitting and receiving apparatus comprising means for deriving picture signals from an object, means for reducing the effective intensity contrast of said signals and feeding them to an output circuit, means for generating signals corresponding to sounds, a coupling between said sound generating means and a second output circuit whereby said sound signals are fed to said second output circuit substantially without change in effective intensity contrast, means for transmitting the signals from said output circuits, means for receiving said sound and picture signals, means for changing the intensity of contrast of the picture signals only, and means for reproducing the sound signals.

CECIL OSWALD BROWNE.
JOHN HARDWICK.